(12) United States Patent
Amagai et al.

(10) Patent No.: US 6,944,182 B1
(45) Date of Patent: Sep. 13, 2005

(54) ATM CELL CONVERSION CIRCUIT AND ATM CELL CONVERSION METHOD

(75) Inventors: Tatsuhiko Amagai, Tokyo (JP); Yuichi Suzuki, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/567,442

(22) Filed: May 10, 2000

(30) Foreign Application Priority Data

May 13, 1999 (JP) ................................. 11-133384

(51) Int. Cl.[7] ............................................. H04J 3/16
(52) U.S. Cl. ..................................... 370/466; 370/412
(58) Field of Search ............................. 370/412, 413, 370/414, 415, 416, 466

(56) References Cited

U.S. PATENT DOCUMENTS

| | | | | |
|---|---|---|---|---|
| 5,764,637 A | * | 6/1998 | Nishihara | ................... 370/397 |
| 6,226,260 B1 | * | 5/2001 | McDysan | ................... 370/216 |
| 6,418,144 B1 | * | 7/2002 | Saeki | ...................... 370/395.6 |
| 6,529,523 B1 | * | 3/2003 | Kato | .......................... 370/466 |

FOREIGN PATENT DOCUMENTS

| | | |
|---|---|---|
| JP | 3-141747 A | 6/1991 |
| JP | 2563819 B2 | 9/1996 |
| JP | 2647002 B2 | 5/1997 |
| JP | 2760343 | 3/1998 |
| JP | 2760343 B2 | 3/1998 |
| JP | 2000-151633 A | 5/2000 |

* cited by examiner

*Primary Examiner*—Chi Pham
*Assistant Examiner*—Keith M. George
(74) *Attorney, Agent, or Firm*—Harrity & Snyder, LLP

(57) ABSTRACT

Sending priority of plural stages is statically assigned according to a quality class and an output connection, and the sending priority is dynamically changed according to a state of sending request stacking every sending priority and a state of ATM cell conversion processing of a frame, and ATM cell conversion request means for issuing an ATM cell conversion request is provided every output route, and the cell conversion processing of the frame is selected and performed in the order of higher sending priority every time one cell conversion.

12 Claims, 7 Drawing Sheets

ATM CELL CONVERSION CIRCUIT AND ATM CELL CONVERSION METHOD

The present invention claims priority from Japanese Patent Application No. 11-133384 filed May 13, 1999, the contents of which are incorporated herein by reference.

BACKGROUND OF THE INVENTION

1. Field of the Invention

The present invention relates to an ATM (Asynchronous Transfer Mode) network and particularly to a technique for converting frame format data into cell format data, which is a transfer format in the ATM network, and outputting the cell.

2. Description of Related Art

In order to perform line accommodation of synchronous transfer mode, exchange control, signaling processing, upper layer processing and so on, an ATM cell conversion circuit for converting frame format data into cell format data has been previously used in an ATM exchange. However, cell conversion by this ATM cell conversion circuit often causes a processing bottleneck at the exchange. Therefore, increasing the speed and efficiency of the processing is desired.

A conventional ATM cell conversion circuit, which is applicable to an exchange switch for outputting ATM cells to multiple routes or an apparatus at the input side of a multiplexer for multiplexing cells on every route, is disclosed in Japanese Patent No.2760343. This ATM cell conversion circuit constructs frame information designated by a processor into ATM cells used in an ATM network with reference to external memory, and outputs the ATM cells to switch means for performing distribution on a output route basis.

In the conventional ATM cell conversion circuit, however, the buffer amount or the ATM network band which the ATM exchange has is finite and on the contrary, consideration of efficiently using finite resources which the exchange or the network has is not given and as the contents of the consideration, for example, a quality class every respective frame or priority assigned every output connection is considered to perform sending.

SUMMARY OF THE INVENTION

The present invention is implemented in view of the above-mentioned problems. It is an object of the invention to provide an ATM cell conversion circuit and an ATM cell conversion method in which, in addition to a cell conversion method statically assigned to every frame or output connection based on a quality class, priority of a frame for cell conversion is dynamically changed by consideraing congestion states of plural stages on every output route, a frame length to be sent or elapsed time of cell conversion processing, etc. The ATM cell conversion circuit and method allows fine sending priority control to be performed. Also, high efficiency ATM cell conversion processing and ATM cell output control can be performed. As a result, efficiency of buffer resources within an apparatus and network use can be improved.

According to a first aspect of the present invention, there is provided an ATM cell conversion circuit including: cell conversion means for performing cell conversion to convert frame format data (hereinafter simply called "frame") into a cell format for transfer in the ATM and outputting the converted cells to switch means for distributing the cells on every route for outputting the cells to an ATM network; and cell conversion request means provided for every output route for issuing a cell conversion request for a frame, whose sending request has occurred in the cell conversion means; wherein the cell conversion means selects the next cell conversion request to process cell conversion of the corresponding frame every time cell conversion of the frame corresponding to one cell conversion request is processed by one cell.

It is preferable that the cell conversion request means sets a sending priority to frames, whose sending request has occurred based on a predetermined condition and the cell conversion means processes cell conversion of the frames, in the order of descending sending priorities of cell conversion requests. It is particularly preferable that static priority for a frame, whose sending request has occurred, is previously assigned based on the quality class and output connection, and the sending priority is dynamically changed based on the number of sending requests (a state of stacking) of the frame to which the same static priority is assigned and the state of cell conversion processing.

Specifically, it is preferable to measure time starting from the time the cell conversion request is issued to the time cell conversion processing starts and raise the sending priority assigned to the corresponding frame as the time elapses. Also, it is preferable to raise the sending priority of a frame during execution of cell conversion processing if a sending request for a frame with a higher sending priority for the same output route has occurred during execution of cell conversion processing of a frame with a lower sending priority. If the number of sending requests of the accepted frames exceeds a certain limit which is predetermined for each sending priority, the cell conversion request means raises the sending priority of that frame. The sending priority of the frame may also be raised when there is a decrease in the residual frame length of a frame to be sent. Cell conversion processing of the frames by rotating priority every time cell conversion and sending of one cell may be performed, if cell conversion requests of the frames with the same sending priority conflict.

It is preferable that the cell conversion means masks a lower priority cell conversion request among cell conversion requests from the cell conversion request means corresponding to the output route based on a congestion state provided for every output route from the switch means. It is convenient for the congestion state to be indicated by a state of a plurality of stages and the number of stages of sending priority of a frame to be set so as to become equal to the number of stages of this congestion state.

Each of the cell conversion means may include: sending request queues of a plurality of stages for accepting a frame sending request with every sending priority statically assigned based on a quality class and an output connection; a queue readout control part for reading out these sending request queues in the order of highest sending priority; and a frame information storage part for dynamically changing the sending priority based on a state of the sending request stacking for each sending priority and a state of cell conversion processing of a frame for each sending priority, and issuing a cell conversion request, including information on the corresponding frame, based on the sending request queues read out. The cell conversion means may include: a frame buffer for storing a frame whose sending request has occurred; and cell division multiplex means for selecting a cell conversion request, in the order of highest sending priority, every time there is one cell conversion, and gaining access to the frame buffer to perform cell conversion processing based on information on a frame included in the cell conversion request.

The cell conversion request may include frame information such as: start address information indicating a storage position of entity information of the corresponding frame in the frame buffer; and frame length information indicating a data length of the frame. In this case, it is preferable that the frame information storage part update the start address information so as to indicate a storage position in the frame buffer of data for the next cell conversion every time cell conversion processing of one cell in the cell division multiplex means occurs, and also updates the frame length information based on the amount of one cell conversion.

The frame information storage part preferably measures the time starting from the time the cell conversion request is issued to the time when the cell conversion processing starts and raises the sending priority assigned to the corresponding frame as the time elapses. The corresponding frame information storage part preferably raises the sending priority of a frame during execution of cell conversion processing if a sending request of a frame with higher sending priority for the same output route has occurred during execution of cell conversion processing of a frame with lower sending priority. If the number of sending requests of the frames accepted in the sending request queues exceeds a certain limit which is predetermined for each sending priority, the sending priority of that frame is raised. Also, the sending priority of the frame to be sent is preferably raised with a decrease in the residual frame length of a frame to be sent.

The cell division multiplex means may perform cell conversion processing of the frames by rotating priority every time cell conversion and sending of one cell occurs, if cell conversion requests of the frames with the same sending priority conflict. The cell division multiplex means preferably masks cell conversion requests issued by the respective frame information storage parts based on the result of comparing the congestion state of a plurality of stages provided for every output route from the switch means and the sending priority of the frame determined by the corresponding frame information storage part.

According to a second aspect of the present invention, there is provided an ATM cell conversion method comprising the steps of: issuing a cell conversion request for a frame whose sending request has occurred for each output route; and selecting the next cell conversion request to process cell conversion of the corresponding frame every time cell conversion of the frame corresponding to one cell conversion request is processed by one cell.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
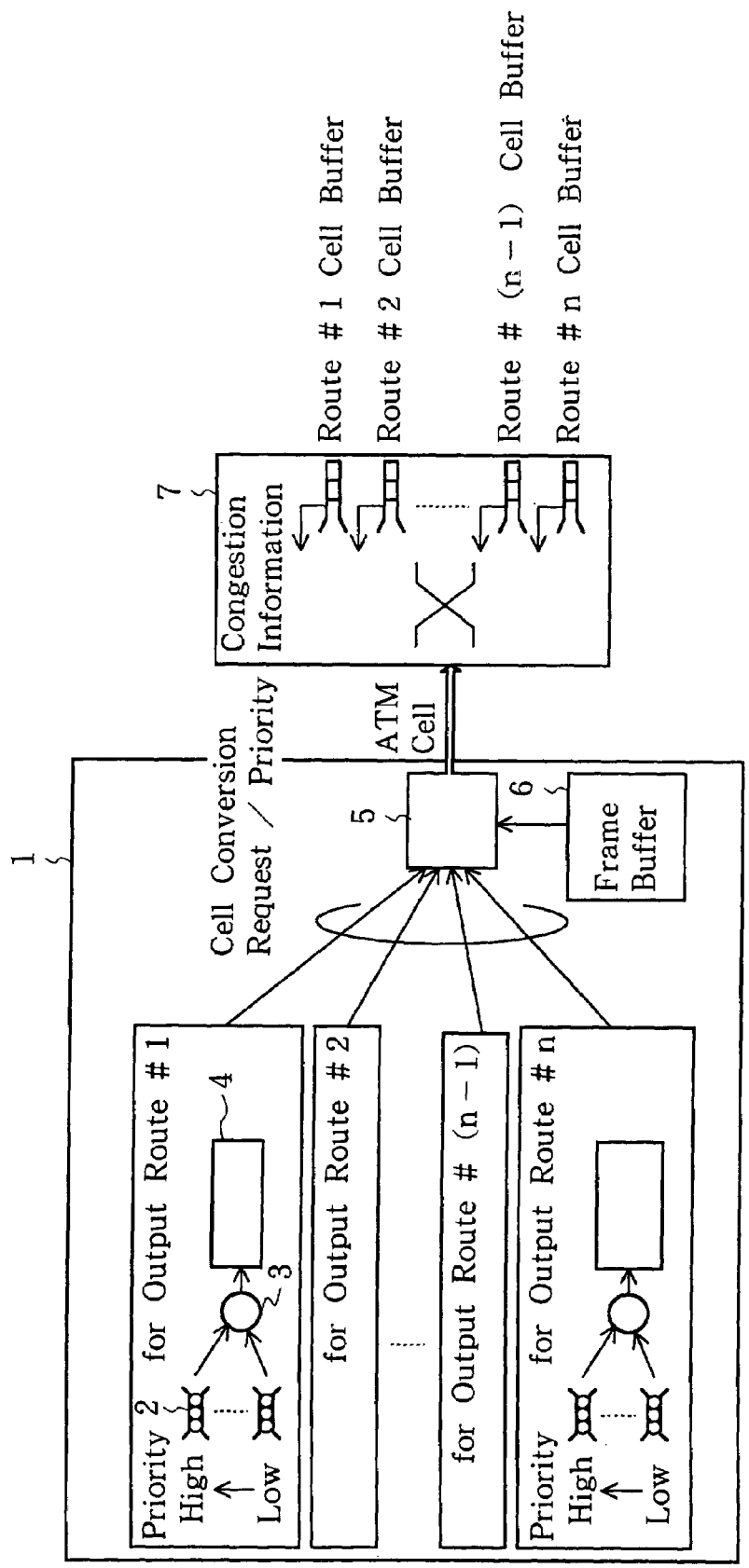
FIG. 1 is a configuration diagram showing one embodiment of an ATM cell conversion circuit of the present invention.

FIG. 1 shows one embodiment of a cell conversion circuit of the present invention. A cell conversion circuit 1 comprises sending request queues 2, a queue readout control part 3, and a frame information storage part 4 for each output route, in order to make sure cell conversion processing is not blocked, and comprises a cell division multiplex part 5 in the output side of the frame information storage part 4. A frame buffer 6 is connected to the cell division multiplex part 5. Frames to be sent are stored in the frame buffer 6 and information about the frames is stored in the frame information storage part 4 for each route.

The cell division multiplex part 5 selects a frame for cell conversion among frames for which storage of information has been completed for each route, by the frame information storage part 4 based on a congestion state of each route provided by a switch core 7 or the sending priority of frames collected by the frame information storage part 4. After the frame is selected, cell division multiplex 5 performs cell conversion and multiplexing and sends the cells to the switch core 7.

The switch core 7 is an output buffer type ATM switch having an output buffer for every route. The output buffer for every route of the switch core 7 has m threshold values, respectively, and can provide the cell conversion circuit 1 with the congestion states of m stages in all of the output routes by comparing the number of cell stacks with the threshold values in the output buffer.

It is assumed that the cell conversion circuit 1 described herein corresponds to an AAL-5 (ATM Adaptation Layer type 5).

The cell conversion circuit 1 has the sending request queues 2 of a frame for every route, and there are a plurality of the sending request queues 2 for every quality class of a frame and output connection. The quality class of the frame corresponds to a traffic class and includes a CBR (constant bit rate) handled in digitized voice or visual or a VBR (variable bit rate) used in traffic such as packet voice. When a frame sending request occurs, the priority of the frame is statically provided based on a quality class and information is stacked in the corresponding stage of the sending request queues 2 based on this priority.

Figure 8:
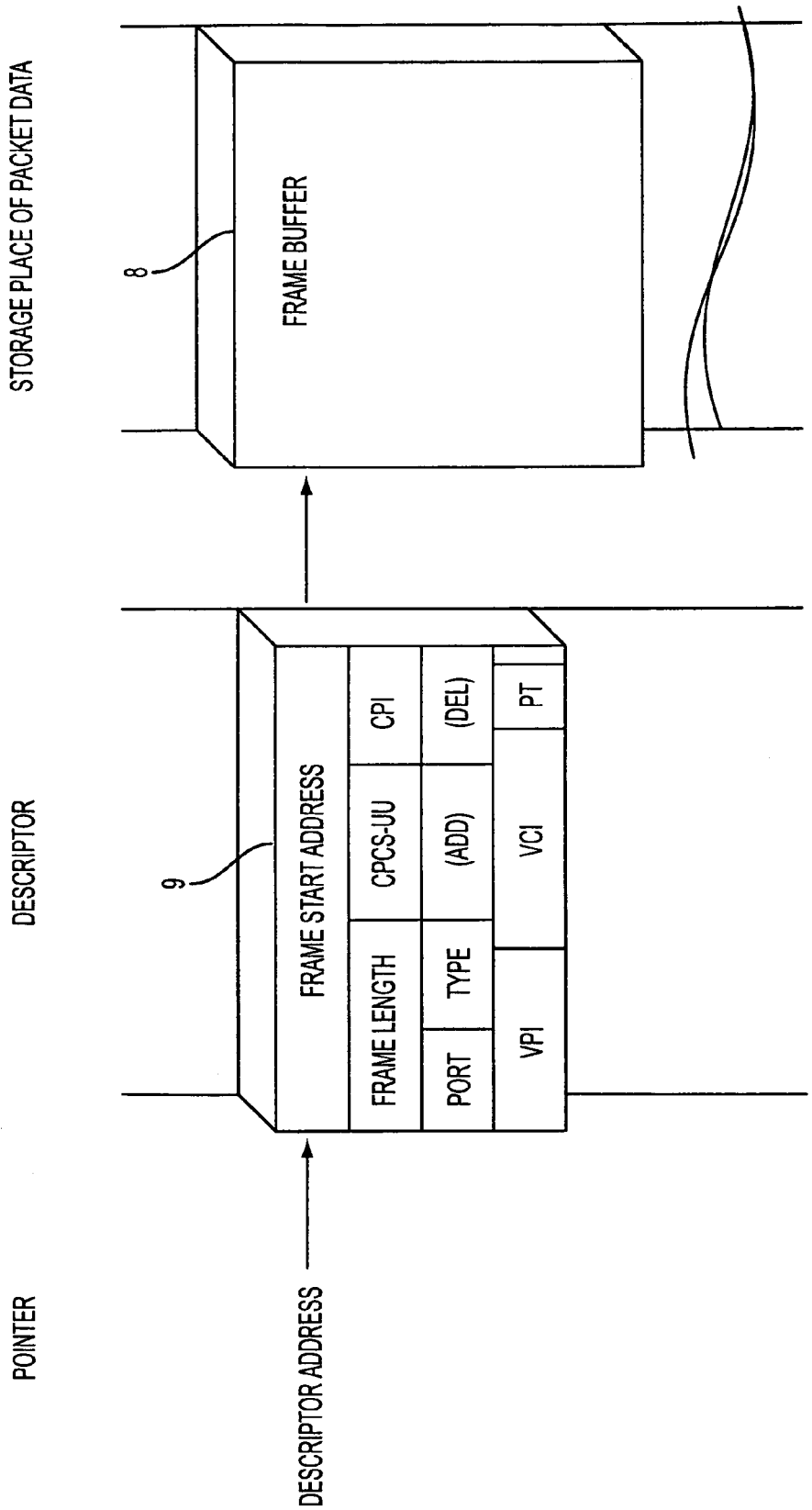
FIG. 8 is an illustration showing a readout relationship of a descriptor address included in the sending request queues, a descriptor collected based on the descriptor address, and a frame from a frame buffer based on the descriptor.

The queue readout control part 3 selects a higher priority queue among the sending request queues 2 with stacking and reads out information. The frame information storage part 4 stores information (descriptor 9) about the frame, when the sending request has occurred, and the statically provided sending priority of the frame based on the information read from the sending request queues 2. The descriptor includes a frame start address indicating a position for storing an entity of said frame in a frame buffer 8, a frame length indicating a data length of the frame, output connections (VPI, VCI) for identifying an output route of the frame, etc. as shown in FIG. 8.

The frame information storage part 4 issues a cell conversion request with the stored frame information to the cell division multiplex part 5 when storage of the descriptor is completed. After the cell division multiplex part 5 receives the cell conversion request from the frame information storage part 4 to send out cells, frame storage information is updated in the frame information storage part 4. The updating is performed so that a storage position of data to make the next cell conversion is indicated by setting the frame start address to "+48 bytes" and the residual frame length is set to "−48 bytes" every time the cell division multiplex part 5 sends out one cell since a payload length of one ATM cell is 48 bytes.

Also, the frame information storage part 4 is provided with a sending timer, and time taken from the time when the frame information storage part 4 completes storage of frame information to the time when the cell division multiplex part 5 receives the cell conversion request and the frame information from the frame information storage part 4 and makes cell conversion of the corresponding frame to send out is measured. When sending has not been completed, even if a predetermined time-out value is reached, the corresponding frame is discarded from the frame buffer 6 by the cell division multiplex part 5.

When a frame has completed cell conversion and been sent or the frame has been discarded by the cell division multiplex part 5, the frame information storage part 4 stops a cell conversion request to the cell division multiplex part 5 and stores information of the next new frame.

As described above, frame information storage part 4 provides the cell division multiplex part 5 with the frame priority information, together with the cell conversion request, and this priority dynamically changes according to an internal state. The initial value of the priority depends on kinds of quality class and output connection determined for every frame, and the priority is incrementally increased from the initial value based on the internal state of the cell conversion circuit.

The first condition for raising the priority is a sending timer value indicated by the sending timer provided in the frame information storage part 4. As described below, since the cell division multiplex part 5 accepts requests in order of priority, there is a fear that a cell conversion request for a lower priority frame will not always be accepted, and thus the frame will frequently be discarded due to a time-out. In the present invention, the priority is incrementally raised with an increase in the sending timer value, with the result that the limit for waiting time of cell conversion can be imposed even for the lower priority frame.

The second condition for raising the priority is a state of a sending request queue. When a sending request of a higher priority frame has occurred for a route in the middle of processing cell conversion of a lower priority frame in the cell division multiplex part 5, a sending request for said route is prompted by raising the priority of the frame currently undergoing cell conversion in order to prevent HOL (Head of Line Blocking). Further, if the number of stacks in a sending request queue exceeds a certain limit, by forcedly raising the priority so as to be held within the limit, the queue load can be distributed to queues for other routes when traffic centralizes on a single route.

Figure 2:
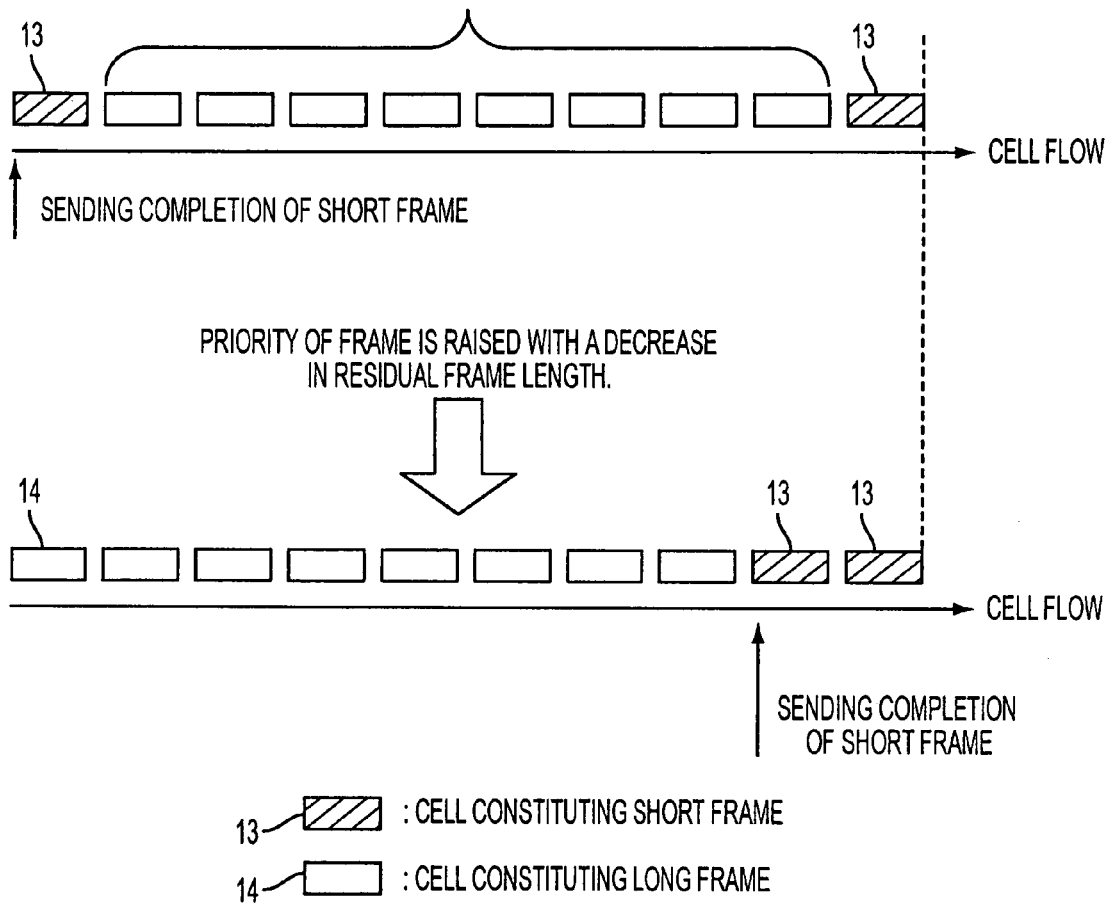
FIG. 2 is an illustration of cell conversion of multiplexed long frames and short frames in the conventional art and the present invention.

The third condition for raising the priority is a residual frame length. The priority is raised higher with a decrease in the residual frame length. In general, a short frame often includes things such as audio information which very often leads to a request for real time processing. Also when a plurality of frames are cell converted and multiplexed, as shown in FIG. 2, the delay time to complete the sending of a short frame (item 13 is an example of a cell constituting a short frame) may increase if a long packet (item 14 is an example of a cell constituting a long frame) is interleaved. Therefore, short frames are preferably processed at a higher priority.

Also, it takes a measure of time to perform operations from reading of the sending request queues 2 by the queue readout control part 3 to collection and storage of information of a sending frame by the frame information storage part 4. Because of that, the frame information storage part 4 promotes cell conversion processing in the cell division multiplex part 5 by raising the priority to the frame which has a short residual frame length. Since the frame completes sending in order of higher priority, preparations for sending a new frame starts when sending is complete. Namely acceleration of new storage of frame information in the frame information storage part 4 can be made during cell conversion of the subsequent frame for other routes. Therefore, the efficiency of the cell conversion processing is improved.

The cell division multiplex part 5 receives cell conversion requests from the frame information storage part 4 for every route and selects a frame to be cell converted. Cell conversion requests are selected in order of higher priority.

Figure 3:
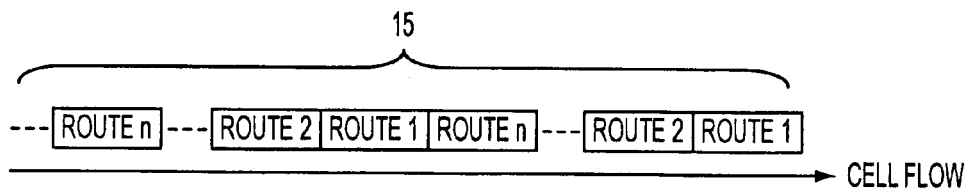
FIG. 3 is an illustration of selecting frames for cell conversion by rotating priority.

If the cell conversion requests of frames with the same priority (item 15) conflict, the frame to be cell converted is selected by rotating priority every time a cell is sent in order to keep fairness as shown in FIG. 3. Further, the cell division multiplex part 5 can control cell sending based on congestion states by masking a cell conversion request from the frame information storage part 4 based on the congestion states of each route provided by the switch core 7. The masking of the cell conversion request is made by associating the priority of m stages of the requested frame with the congestion state of m stages of the switch core 7. If a route n of the switch core 7 is in the congestion state of m stage, when the priority of a frame for the route n is lower than m, the cell conversion request is masked and cell sending of the frame for the route n is stopped.

In this case, information on the frame itself whose cell conversion request has been masked is not sent out and remains stored in the frame buffer. When the congestion state of a route to be outputted becomes lower than or equal to the priority of the frame, the cell division multiplex part 5 releases mask processing to the above cell conversion request and reads out the corresponding frame from the frame buffer 6 to process the cell conversion and then, performs output to the switch core 7.

When determining a frame to be cell converted, the cell division multiplex part 5 reads out one cell of data from the frame buffer 6 based on a frame start address provided from the corresponding frame information storage part 4 and attaches ATM cell headers (Frame Length, CPCS-UU, CPI shown in FIG. 8) and sends the data to the switch core 7. When the sent frame is EOM (End of Message), namely the residual frame length to be sent is shorter than 48 bytes, padding and AAL5 trailer are appended as necessary.

Next, readout control of a plurality of the sending request queues 2 by the queue readout control part 3 will be described in detail with reference to FIG. 4.

Here, priority statically given for every quality class or output connection of a frame will be described as two stages. The queue readout control part 3 reads out a low delay sending queue which is a queue for high delay priority frames among sending request queues for each output route by absolute priority.

Figure 4:
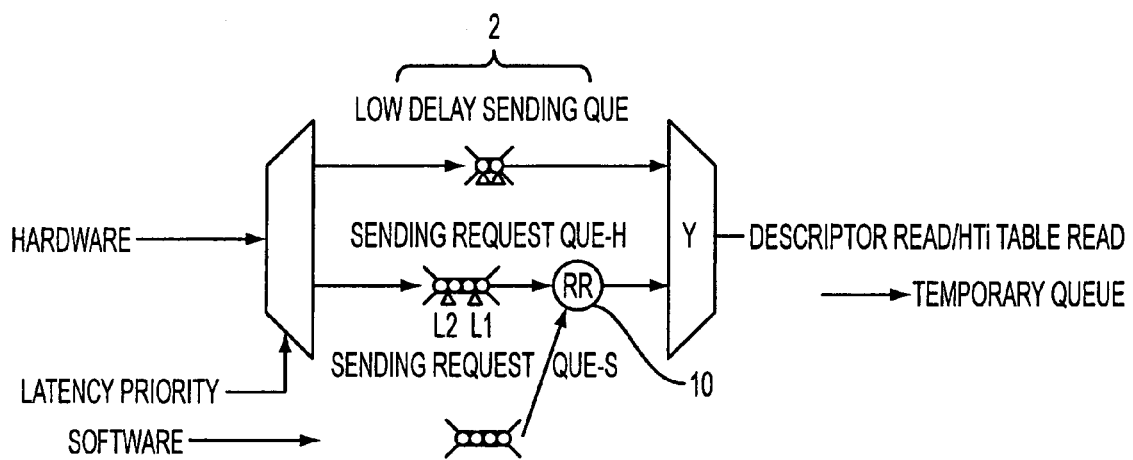
FIG. 4 is an illustration of readout control of a plurality of sending request queues by a queue readout control part.

As shown in FIG. 4, for a hardware sending request, priority of two stages is given to the frame whose sending is requested based on the quality class or output connection. For a software sending request, delay priority control in this position is not performed since the low delay sending queue is not provided, and a sending request queue from hardware and a sending request queue from software are selected to read it out by rotating priority through a round robin part RR 10.

A descriptor address of a frame is stacked in the sending request queues 2 for each output route, and when the queue readout control part 3 reads out the descriptor address, the queue readout control part 3 outputs it to the frame information storage part 4, and the frame information storage part 4 reads a descriptor from external memory based on the inputted descriptor address and stores it in a temporary queue provided in the frame information storage part 4.

Figure 5:
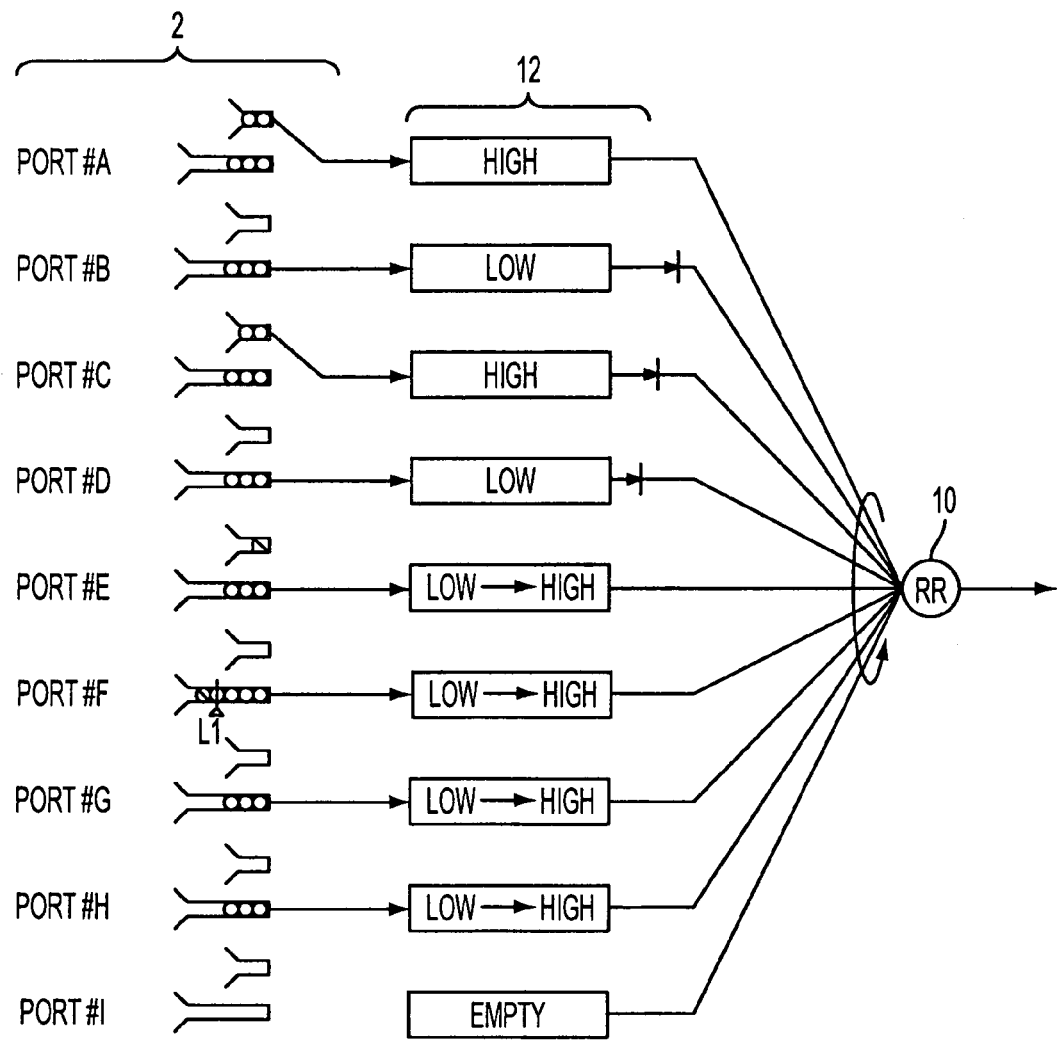
FIG. 5 is an illustration of delay priority control.

FIG. 5 is an illustration showing an image of delay priority control. Here, priority is statically given for every quality class or output connection of a frame and priority is dynamically changed by the above-mentioned first to third conditions as will be described for two stages. In the queue readout control part 3, a low delay sending queue is read out by absolute priority (Port #a). When a sending processing request of a higher priority frame has occurred from another route, the cell division multiplex part 5 masks (e.g., item 11) a sending request signal of a lower priority frame and a sending of the frame is stopped (Port #b). When cell conversion processing is in conflict between routes, for the same priority, the routes are selected every time one cell is sent by rotating priority through the round robin part RR 10 provided in the input side of the cell division multiplex part 5. However, if the priorities are different, a cell conversion request of a high delay priority frame is selected in order of higher priority.

The switch core 7 provides the cell division multiplex part 5 with the congestion states of plural stages for every route. Here, assuming that the cell division multiplex part 5 is provided with the congestion states by back pressure signals (BP) of two stages, when a lower priority frame of a BP level 1 is provided, the cell division multiplex part 5 masks a cell conversion request signal of this frame and cell sending of the frame is stopped (Port #d). When a frame of a BP level 2 is provided, the cell division multiplex part 5 masks a cell conversion request signal of the frame regardless of whether the frame of the provided route is lower priority or higher priority (Port #c).

Also, when delay priority is low, priority is raised during cell conversion in the following cases. When a low delay sending queue with higher priority occurs during cell conversion of a lower priority frame (a low delay queue becomes Not Empty), the priority of the frame currently undergoing cell conversion is raised in order to prevent HOL (Port #e). Further, if the number of stacks in a sending request queue exceeds a certain limit, the priority of the corresponding frame is raised so as to be held within the limit. Therefore, the queue load can be distributed to queues for other routes when traffic centralizes on a single route (Port #f).

Furthermore, by incrementally raising the priority with an increase in a sending timer value and raising the priority of the low delay priority frame to a higher priority, a fear that a cell conversion request for a lower priority frame will not always be accepted, and thus the frame will frequently be discarded due to a time-out, can be avoided (Port #g).

When frame length information of a descriptor stored in a temporary queue within the frame information storage part 4 is updated every time a cell is sent and the residual frame length is shorter than 48 bytes, namely the sent cells are only EOM, the frame of the low delay priority is raised to higher priority and cell conversion in the cell division multiplex part 5 is promoted. As a result, the frame completes sending in order of higher priority, and preparations for sending a new frame starts when sending is complete, namely acceleration of new storage of frame information in the frame information storage part 4 can be made during cell conversion of the subsequent frame for other routes by the cell division multiplex part 5. Therefore, the efficiency of the frame cell conversion processing is improved (Port #h).

Figure 6:
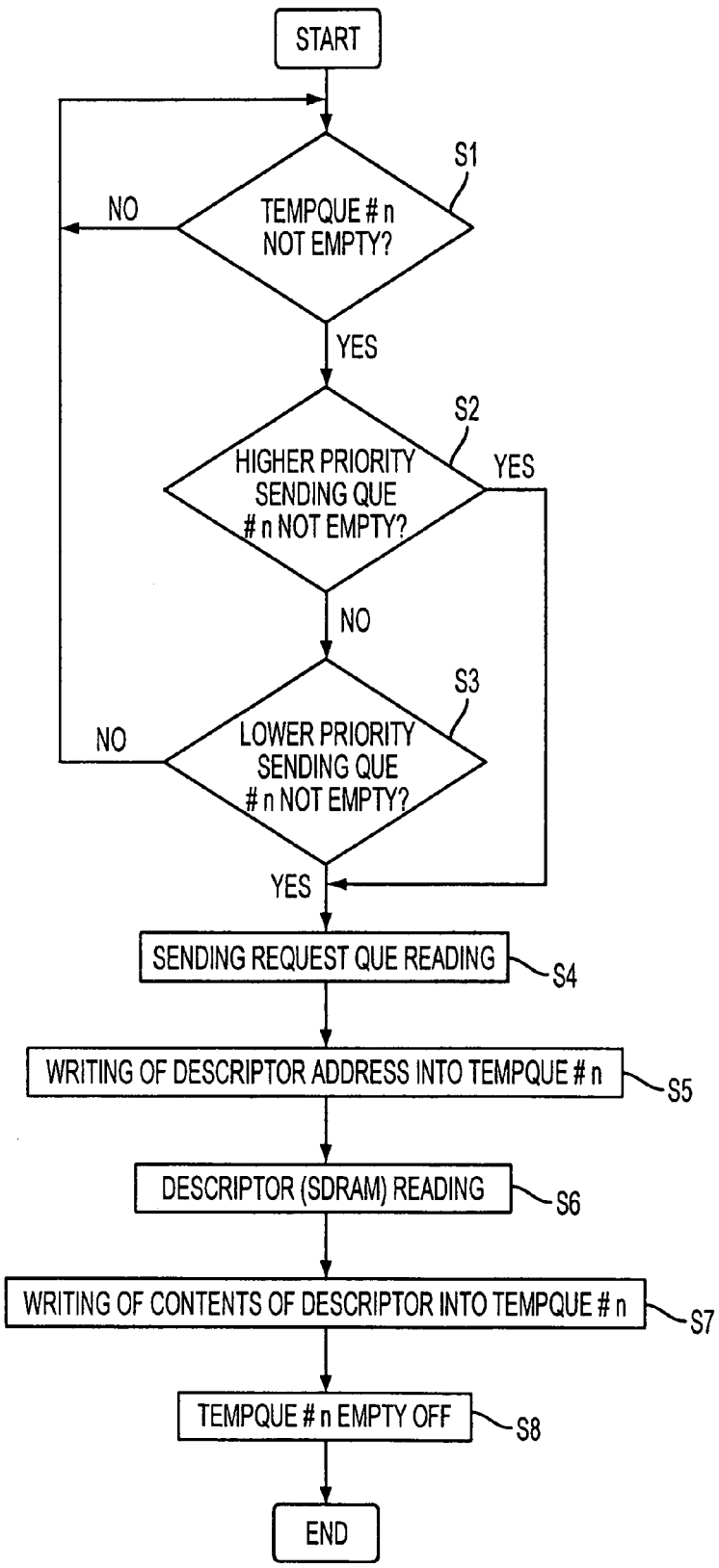
FIG. 6 is a flowchart showing processing operations from readout of the sending request queues of frames by the queue readout control part to writing of a descriptor into a temporary queue provided in a frame information storage part.

Next, processing operations from the readout of the sending request queues 2 of frames by the queue readout control part 3 in each route to the writing of a descriptor into a temporary queue 12 provided inside the frame information storage part 4 will be described in detail with reference to the flowchart of FIG. 6.

First, the queue readout control part 3 determines whether or not the temporary queue 12 provided inside the frame information storage part 4 is empty, namely whether or not the descriptor is stored in the temporary queue 12 (step S1). If the queue readout control part 3 determines that the descriptor is not stored in the temporary queue 12 (step S1/No), step S1 is executed again. If the descriptor is stored in the temporary queue 12 (step S1/Yes), it is then determined whether or not a higher priority sending queue of the sending request queues 2 is empty (step S2).

If the queue readout control part 3 determines that the higher priority sending queue is empty in step S2 (step S2/No), it is then determined whether or not a lower priority sending queue of the sending request queues is empty (step S3). If the queue readout control part 3 determines that the lower priority sending queue is not empty (step S3/Yes), the corresponding sending request queue 2 is read out (step S4).

If the queue readout control part 3 determines that the higher priority sending queue is not empty in step S2 (step S2/Yes), processing proceeds to step S4 and the corresponding sending request queue 2 is read out. If the queue readout control part 3 determines that the lower priority sending queue is empty (step S3/No), processing proceeds to step S1, and it is again determined whether or not the temporary queue 12 provided inside the frame information storage part 4 is empty.

When the sending request queue 2 of step S4 is read out, data stacked in the sending request queue 2 includes a descriptor address, so that the frame information storage part 4 writes the descriptor address read out into the temporary queue 12 (step S5), and the corresponding descriptor is read from external memory (SDRAM in this case) by referring to this address (step S6), and the descriptor is written into the temporary queue 12 (step S7). At this time, a state of the temporary queue 12 is released from empty (step S8).

Figure 7:
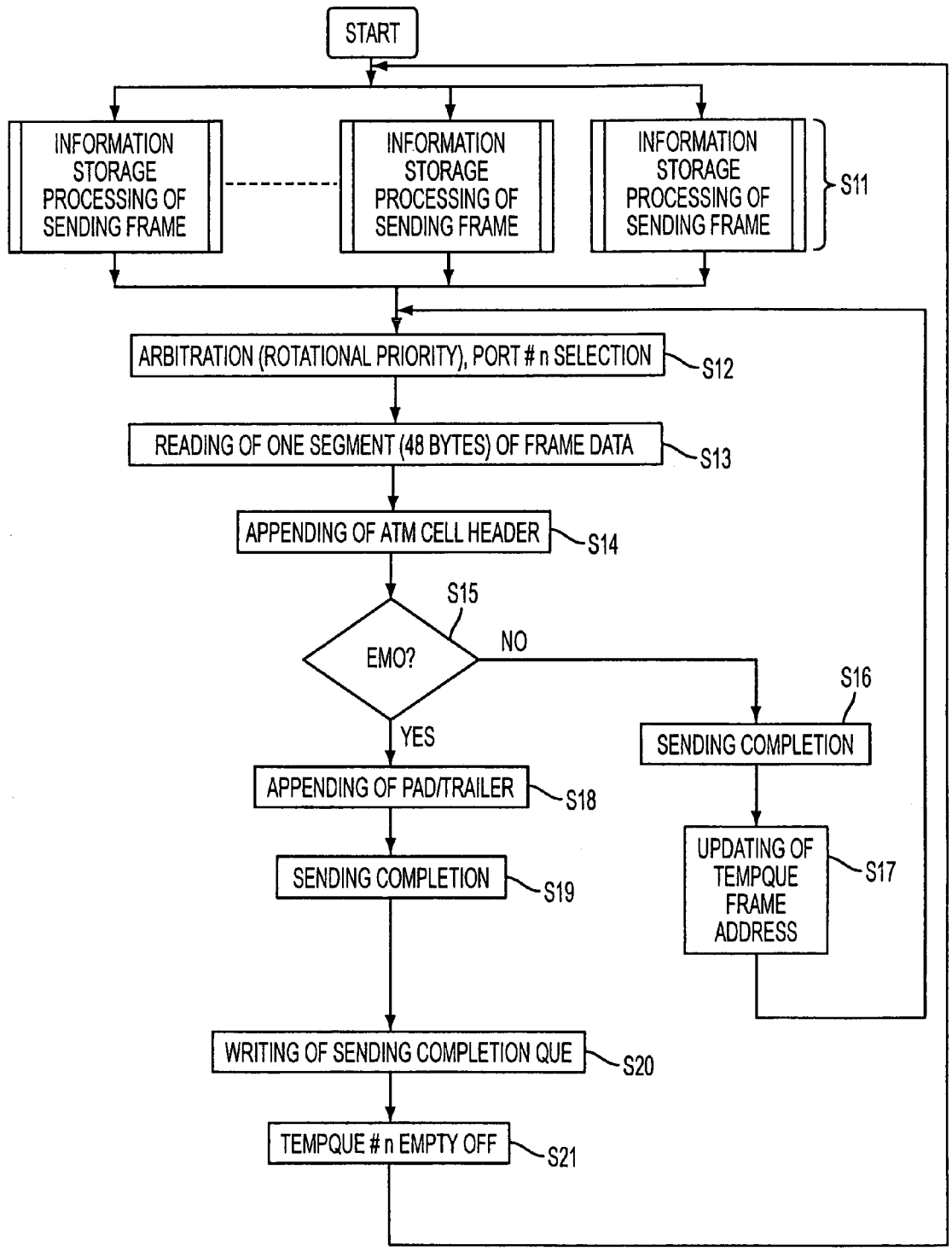
FIG. 7 is a flowchart showing processing operations such as storage processing of frame information by the frame information storage part, selection of a sending frame in a cell division multiplex part, cell construction of frames and cell sending.

Next, processing operations such as storage processing of frame information (descriptor) in the frame information storage part 4 of each route, selection of a sending frame in the cell division multiplex part 5, cell construction of frames and cell sending will be described in detail using a flowchart shown in FIG. 7.

First, in the frame information storage part 4 of each route, while priority is dynamically given to a frame to which priority is statically assigned based on an internal state within a circuit, information (descriptor) of the frame is collected and stored (step S11). The cell division multiplex part 5 selects a frame for cell conversion by inputing priority given to a sending frame of each route through the round robin part RR provided in the input side. If the cell conversion requests of frames with the same priority conflict, the frame to be cell converted is selected by rotating priority every time one cell is sent in order to keep fairness (step S12).

When selecting the frame for cell conversion, the cell division multiplex part 5 reads out one segment (48 bytes) of frame data from a frame buffer based on a frame start address of a descriptor provided from the corresponding frame information storage part 4 (step S 13), and CRC operations are performed and ATM cell headers are appended (step S14). In this case, the cell division multiplex part 5 determines whether or not the frame data appended to the ATM cell headers is EOM based on information of a frame length included in the descriptor provided from the frame information storage part 4 (step S 15).

In step S15, if the cell division multiplex part 5 determines that the frame data for making cell conversion is not EOM (step S 151No), the cell is sent to the switch core 7 (step S16), and the frame information storage part 4 updates the start address of the frame buffer in the descriptor stored in the temporary queue 12 to "+48 bytes" and the residual frame length to be sent to "−48 bytes" (step S17).

In step S15, if the cell division multiplex part 5 determines that the frame data for making cell conversion is EOM (step S15/Yes), as necessary, padding and AAL5 trailer are appended and cell conversion is made (step S 18), and the cell is sent to the switch core 7 (step S 19). When frame sending is completed, the cell division multiplex part 5 writes a descriptor address of the frame into a sending completion queue within the frame buffer (step S20). Thereby, the frame information storage part 4 frees the descriptor of the frame stored in the temporary queue 12 and sets the temporary queue 12 to empty (step S21). Information on the frame itself newly stored in the frame buffer is preserved in the corresponding position by referring to the written sending completion queue.

As is evident from the above description, according to the present invention, since sending request queues or a frame information storage part are provided independently for every output route, even if one route becomes congested and cells being sent to the corresponding route are stopped, cell conversion and sending for other routes can be made. Therefore, efficiency of buffer use can be improved and a discard rate of frames or cells in the whole apparatus can be reduced.

Since cell conversion is performed based on priority of the frame, higher priority data can be processed with a low delay and a low discard rate. Also, by dynamically changing the priority of the frame for cell conversion during cell conversion processing, fine priority control can be performed, with the result that high efficiency apparatus and network operations can be performed.

By changing the priority with the elapsed time of cell conversion processing, the limit for waiting time of the cell conversion processing of a lower priority frame can be imposed.

In the condition that a sending request of a higher priority frame for the same route has occurred during processing of a lower priority frame, the priority of the frame currently being cell converted is raised to promote processing of the corresponding route, with the result that the delay time of sending of the subsequent higher priority frame can be reduced.

Since a route with a heavy load is recognized by a state of queues for every route which a cell conversion circuit itself has and priority of a frame can be dynamically changed based on the load state, the load can be distributed to other routes with lighter loads and the efficiency of buffer use can be improved.

In sending a plurality of frames with the same priority, sending can be alternately performed in a unit of cell which is a smaller data unit, so that fairness can be held in terms of sending delay time. Also, a higher priority frame can interrupt sending processing of a lower priority frame in the unit of cell, time of the sending processing of the higher priority frame can be reduced to a shorter time unit.

During cell conversion processing of a frame, priority can be dynamically changed based on a frame length, so that efficiency of the cell conversion processing can be improved, while a shorter frame is processed in order of higher priority.

A cell conversion circuit of the present invention can grasp congestion states of plural stages for every route, and by defining priorities of the same number as the congestion states quantized in the plural stages to sending data, finer priority control can be performed in cell conversion processing and cell sending.

What is claimed is:

1. An asynchronous transfer mode (ATM) cell conversion circuit comprising:
    cell conversion means for converting frame format data into cells and outputting the cells to switch means for distributing cells for every route for output to an ATM network; and
    cell conversion request means provided for every output route for issuing a cell conversion request for a frame, which has been requested to be sent, to the cell conversion means;
    wherein the cell conversion request means sets sending priority for frames, that have been requested to be sent, based on a predetermined condition, and the cell conversion means cell converts the frames in the order of descending sending priorities of cell conversion requests.

2. An ATM cell conversion circuit as defined in claim 1, wherein the cell conversion request means assigns static priority to a frame, that has been requested to be sent, based on the quality class and output connection, and dynamically changes sending priority based on the number of sending requests to which the same static priority is assigned and a state of cell conversion processing.

3. An ATM cell conversion circuit as defined in claim 2, wherein the cell conversion request means measures time from a time when the cell conversion request is issued to a time when the cell conversion processing starts and raises the sending priority assigned to the corresponding frame as time elapses.

4. An ATM cell conversion circuit as defined in claim 2, wherein the cell conversion request means raises the sending priority of a frame, during execution of cell conversion processing, if a sending request of a frame with a higher sending priority for the same output route has occurred during execution of cell conversion processing of a frame with a lower sending priority.

5. An ATM cell conversion circuit as defined in claim 2, wherein if the number of sending requests of accepted frames exceeds a certain limit which is predetermined for each sending priority, the cell conversion request means raises the sending priority of the frames.

6. An ATM cell conversion circuit as defined in claim 2, wherein the cell conversion request means raises the sending priority of the frame with a decrease in residual frame length of a frame to be sent.

7. An ATM cell conversion circuit as defined in claim 1, wherein the cell conversion means performs cell conversion processing of the frames by rotational priority if cell conversion requests of frames with the same sending priority conflict.

8. An ATM cell conversion circuit as defined in claim 1, wherein the cell conversion means masks a lower priority cell conversion request among cell conversion requests from the cell conversion request means corresponding to an output route based on a congestion state provided for every output route from the switch means.

9. An ATM cell conversion circuit as defined in claim 8, wherein the congestion state is indicated by a state of a plurality of stages and the number of stages of sending priority of a frame is set to the number of stages of this the congestion state.

10. An ATM cell conversion circuit comprising:
cell conversion means for converting frame format data into cells and outputting the converted cells to switch means for distributing the cells for every route for output to an ATM network; and
cell conversion request means provided for every output route for issuing a cell conversion request for a frame, which has been requested to be sent, to the cell conversion means, wherein:
the cell conversion means comprises:
sending request queues of plural stages for accepting a sending request of a frame for every sending priority statically assigned based on a quality class and an output connection;
a queue readout control part for reading out the sending request queues in the order of higher sending priority; and
a frame information storage part for dynamically changing sending priority based on a state of sending request stacking for every sending priority and a state of cell conversion processing of a frame for every sending priority and issuing a cell conversion request, which comprises information about the corresponding frame, based on the sending request queues read out; and
the cell conversion means includes:
a frame buffer for storing a frame whose sending request has occurred; and
cell division multiplex means for selecting a cell conversion request in the order of higher sending priority every time one cell is converted and accessing the frame buffer to perform cell conversion processing based on information of a frame included in the cell conversion request.

11. An ATM cell conversion circuit as defined in claim 10, wherein information about a frame comprises start address information indicating a storage position of entity information of the corresponding frame in the frame buffer, and frame length information indicating a data length of the frame.

12. An ATM cell conversion circuit as defined in claim 11, wherein the frame information storage part updates the start address information to indicate a storage position in the frame buffer of the next data to undergo cell conversion every time cell conversion processing of one cell is performed in the cell division multiplex means, and updates the frame length information based on the amount of one cell conversion.

* * * * *

UNITED STATES PATENT AND TRADEMARK OFFICE
CERTIFICATE OF CORRECTION

PATENT NO. : 6,944,182 B1  Page 1 of 1
DATED : September 13, 2005
INVENTOR(S) : Tatsuhiko Amagai et al.

It is certified that error appears in the above-identified patent and that said Letters Patent is hereby corrected as shown below:

Column 11,
Line 19, delete "this".

Signed and Sealed this

Seventh Day of February, 2006

JON W. DUDAS
*Director of the United States Patent and Trademark Office*